(12) United States Patent
Kuwahara

(10) Patent No.: US 6,328,142 B1
(45) Date of Patent: Dec. 11, 2001

(54) EDDY-CURRENT DECELERATION APPARATUS

(75) Inventor: Tohru Kuwahara, Kanagawa (JP)

(73) Assignee: Isuzu Motors Limited (JP)

( * ) Notice: Subject to any disclaimer, the term of this patent is extended or adjusted under 35 U.S.C. 154(b) by 0 days.

(21) Appl. No.: 09/627,288

(22) Filed: Jul. 28, 2000

(30) Foreign Application Priority Data

Jul. 29, 1999 (JP) .................................................. 11-214717

(51) Int. Cl.[7] .............................. H02K 49/02; B60L 7/28
(52) U.S. Cl. ......................... 188/158; 188/164; 188/267; 188/382
(58) Field of Search ..................................... 188/156, 164, 188/267, 159, 161, 163, 382; 310/77, 105; 303/20; 335/216

(56) References Cited

U.S. PATENT DOCUMENTS

| 5,023,499 | * | 6/1991 | Kuwahara | 188/164 |
| 5,145,038 | * | 9/1992 | Kuwahara | 188/158 |
| 5,303,802 | * | 4/1994 | Kuwahara | 188/158 |
| 5,804,897 | * | 9/1998 | Kuwahara | 310/77 |
| 5,855,256 | * | 1/1999 | Kuwahara | 188/164 |
| 6,025,664 | * | 2/2000 | Kuwahara | 310/77 |
| 6,039,157 | * | 3/2000 | Yamada et al. | 188/158 |
| 6,176,355 | * | 1/2001 | Yamamoto | 188/267 |
| 6,209,688 | * | 4/2001 | Kuwahara | 188/158 |
| 6,237,728 | * | 5/2001 | Kobayashi et al. | 188/158 |

FOREIGN PATENT DOCUMENTS

| 11235005 | * | 8/1999 | (JP) . |
| 102239 | * | 4/2000 | (JP) . |
| 102240 | * | 4/2000 | (JP) . |

* cited by examiner

Primary Examiner—Douglas C. Butler
(74) Attorney, Agent, or Firm—John E. Toupal; Harold G. Jarcho

(57) ABSTRACT

An eddy-current apparatus including a movable magnet support tube (25) disposed internally of a brake drum (8), and supporting an array of magnets (15) operable to generate a braking force in the brake drum (8). An outer guide tube (22) covers the magnet support tube (25) and consists of alternating magnetic first sections (41) and non-magnetic or weak magnetic second sections (41a). The outer guide tube (22) is formed of magnetic stainless steel, and the second sections (41a) are formed by being rapidly cooled from a high temperature state (partial solution state) into a non-magnetic or weak magnetic austenite phase.

15 Claims, 10 Drawing Sheets

EDDY-CURRENT DECELERATION APPARATUS

BACKGROUND OF THE INVENTION

The present invention relates to a magnetic eddy-current braking apparatus for assisting a frictional brake of a vehicle, and more particularly, to an eddy-current braking apparatus provided with a tube for protecting permanent magnets.

In a conventional eddy-current braking system provided with one or more magnet support tubes, relatively thick (approximately 10 to 16 mm) ferromagnetic plates have been used with a tube formed of a nonmagnetic material in order to prevent leakage of magnetic flux from permanent magnets. To accomplish the above, a magnetic plate is cast into a tube body formed of aluminum, or a tube is formed by a deformation process from stainless steel plate as a nonmagnetic material and ferromagnetic pole pieces are fitted into a number of openings provided in the tube and connected by welding. In the former method, manufacturing is difficult, and the yield or available percentage of aluminum cast product as a tube is poor. Further, according to the former method, the connecting strength between the magnetic pole pieces and the aluminum body of the tube is so weak that impregnating material or the like is filled into the clearances. Further, the manufacturing cost increases because of machining tolerances, when the outer peripheral surface of the tube opposite to the inner peripheral surface of the brake drum and the inner peripheral surface opposite to the magnets are subjected to required machining. Also in the latter method, it is difficult to reduce the cost of manufacturing because of costs associated with welding the magnetic plates to the tube.

In view of the aforementioned problems, the object of the present invention is to provide an eddy-current deceleration apparatus which is easier and less expensive to manufacture.

SUMMARY OF THE INVENTION

To solve the aforementioned problems, according to the present invention, a protective guide tube is formed of stainless steel as a magnetic material, and portions not opposite to the permanent magnets are dissolved in a high temperature state and rapidly cooled into a nonmagnetic or weak magnetic austenite phase.

The guide tube covering a magnet support tube is manufactured from a seamless steel pipe formed of martensite stainless steel having a wall thickness of 10 to 16 mm as a magnetic material or a steel pipe made from steel plate. Portions opposite to the magnets of the outer guide tube remain magnetic, and portions not aligned with the magnets are rapidly cooled after being heated to a high temperature of 800 to 1350 degrees Centigrade (in a partial solution state) thereby creating nonmagnetic portions or weak magnetic portions so as to prevent magnetic short-circuiting (magnetic short) in the guide tube during braking. The stainless steel used as magnetic material can be, for example, 13 chromium (Cr) stainless steel, 17 chromium (Cr) ferrite stainless steel, and the like. The tube formed of stainless steel is cut out to form an outer guide tube such that thick portions (magnetic plates, thickness of 10 to 16 mm) opposite to magnets and thin portions not opposite to magnets are arranged alternately in a peripheral direction. Since the thick portions maintain the characteristics of a magnetic material, and the thin portions are converted into non-magnetic or weak magnetic material, the operation and effect similar to the conventional outer guide tube is obtained with a reduction in manufacturing cost and weight. In place of machining the thin portions from a thick tube of stainless steel, there can be employed alternatively a method in which thick portions of magnetic plates opposite to magnets and thin portions not opposite to magnets are formed by casting or forging a pipe of stainless steel as a magnetic material, and the thin portions thereof heated to a high temperature state in not less than 800 degrees Centigrade (in a partial solution state) and subsequently rapidly cooled into a non-magnetic or weak magnetic austenite phase.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
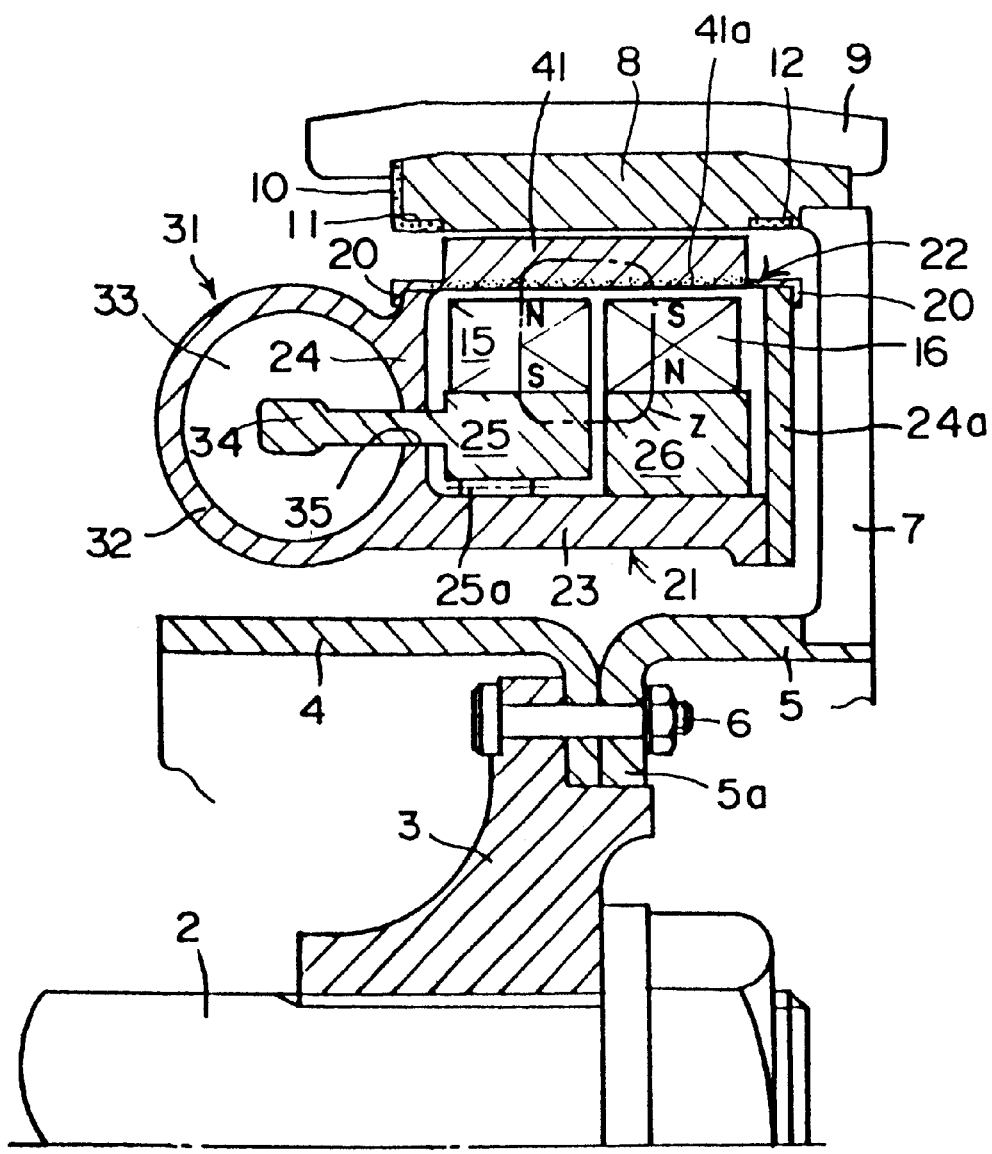
FIG. 1 is a front sectional view of an eddy-current braking apparatus to which the present invention is applied.

As shown in FIG. 1, a flange 5a of a boss portion 5 of a brake drum 8 and an end wall plate of a parking brake brake drum 4 are fastened to a mounting flange 3 spline-fitted into an output rotational shaft 2 of a vehicles gears by means of a plurality of bolts and nuts 6. A right end portion of the brake drum 8 is provided with a number of cooling fins 9 connected by welding or the like to the ends of a number of support arms 7 projecting radially and outwardly from the boss portion 5. Connected to the end wall surface of an open end portion of the brake drum 8 is an annular member 10 formed of a conductor such as copper, and an annular member 11 integral with the annular member 10 is secured to a left end portion of the inner peripheral surface of the brake drum 8. A similar annular member 12 is secured also to a right end portion of the inner peripheral surface of the brake drum 8. The annular plates 10 to 12 axially spread the eddy current flowing through the brake drum 8 to thereby increase brake torque.

Provided internally of the brake drum 8 is a guide tube 21 having a rectangular (in section) hollow portion. The guide tube 21 has an L-shape (in section) tubular portion with a side wall 24 and an inner guide tube 23 formed of a nonmagnetic material, an annular side wall plate 24a formed of a nonmagnetic material, and an outer tube 22 formed of 13 chromium stainless steel. Opposite edge portions 20 of the outer guide tube 22 preferably are bent radially and inwardly as shown. The side wall 24a is attached to the inner guide tube 23 by a plurality of bolts (not shown) and the opposite edge portions 20 of the outer guide tube 22 is secured to the side walls 24, 24a by a plurality of bolts (not shown).

Figure 2:
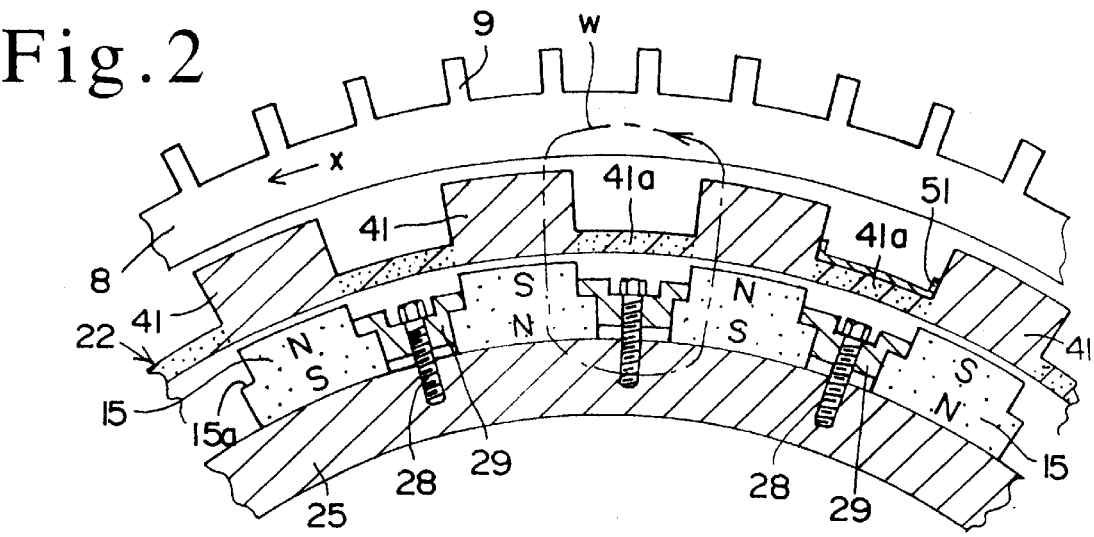
FIG. 2 is a side sectional view showing main parts of the apparatus shown in FIG. 1.

According to the present invention, the outer guide tube 22 is formed integrally with a plurality of alternating first and second sections 41 and 41a. The relatively thick first sections 41 and the relatively thin second sections 41a are formed from stainless steel as a magnetic material, for example 13 chromium (Cr) stainless steel. More specifically, as shown in FIG. 2, the outer peripheral wall of the outer guide tube 22 is machined to form the thin sections 41a and leaving the thick sections (corresponding pole pieces) 41 having uniform peripheral width and a uniform radial thickness. Each thin section 41a is heated to austenite phase at a temperature not less than 800 degrees Centigrade and then rapidly cooled into a nonmagnetic or weak magnetic state. Preferably, a U-shape (in section) reinforcing plate 51 formed of a nonmagnetic material is secured to each thin section 41a. However, in place of machining the thin sections 41a from the outer guide tube 22, the thick sections 41 and thin sections 41a can be formed integrally by casting or forging of, for example, 13 chromium stainless steel as a magnetic material. The peripheral width of each thick section 41 is made greater than that of each thin section 41a and the thick sections 41 are equally spaced apart in an annular array. In other words, the outer surface area of each thick section 41 is made narrower than that of its inner surface.

The hollow portion of the guide tube 21 retains a movable magnet support tube 25 made of a magnetic material and an immovable magnet support tube 26. The movable magnet support tube 25 is supported for reversible rotation on the inner guide tube 23 by a bearing 25a, and the stationary magnet support tube 26 is secured to the inner guide tube 23 by bolts (not shown). An annular array of permanent magnets 15, 16 (FIG. 2) are disposed opposite to the thick sections 41 and are supported on the outer peripheral surfaces of the magnet support tubes 25, 26. The magnets 15, 16 are arranged so that their polarities opposite to the thick sections 41 are different alternately in an annular direction. A fluid pressure actuator 31 for reversibly rotating the movable magnet support tube 25 has a piston 33 fitted into a cylinder 32 formed integrally with the side wall 24 to define both end chambers, and an outer end of a rod extending from the piston 33 is connected to an arm 34 projecting outwardly via a slit 35 in the side wall 24 of the magnet support tube 25.

In a non-braking condition, the polarities of the magnets 15 of the magnet support tube 25 and the magnets 16 of the magnet support tube 26 are reversed to each other, as shown in FIG. 1, and a magnetic short-circuit z is established between the magnet support tubes 25, 26 and the thick sections 41. Accordingly, the magnetic fields of the magnets 15, 16 do not reach the brake drum 8, and a braking torque is not generated. Conversely, in a braking condition, the magnet support tube 25 is rotated by the fluid pressure actuator 31 to provide the same polarities of the magnets 15, 16 radially aligned with the common thick sections 41. Accordingly, when the rotating brake drum 8 transverses the magnetic fields from the magnets 15, 16, a brake torque is provided by the eddy currents circulated in the brake drum 8. At that time, a magnetic circuit w is generated between the brake drum 8 and the magnet supports tubes 25, 26, as shown in FIG. 2.

Figure 3:
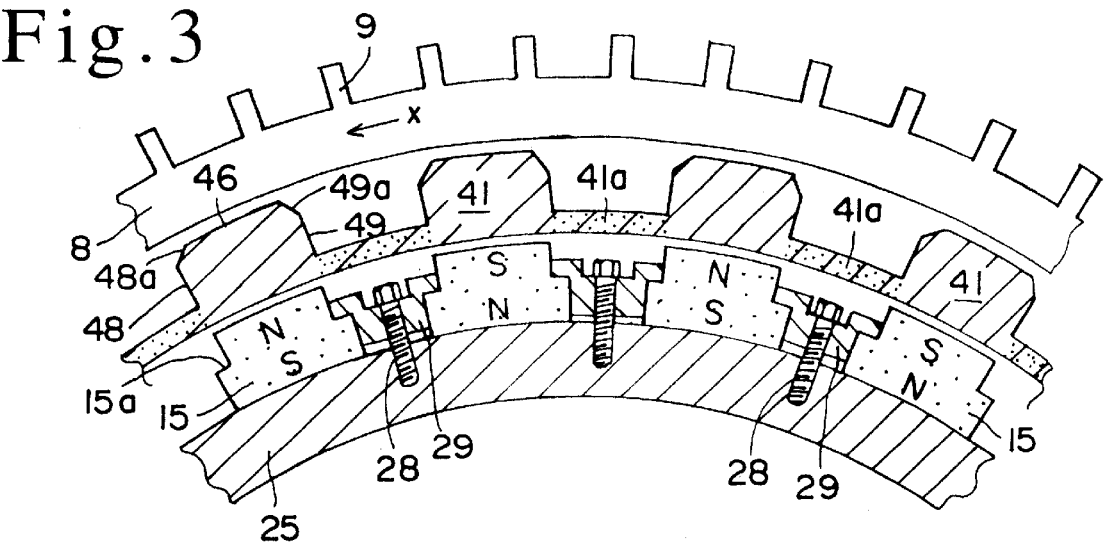
FIG. 3 is a side sectional view showing a partly modified embodiment of the apparatus.
Figure 4:
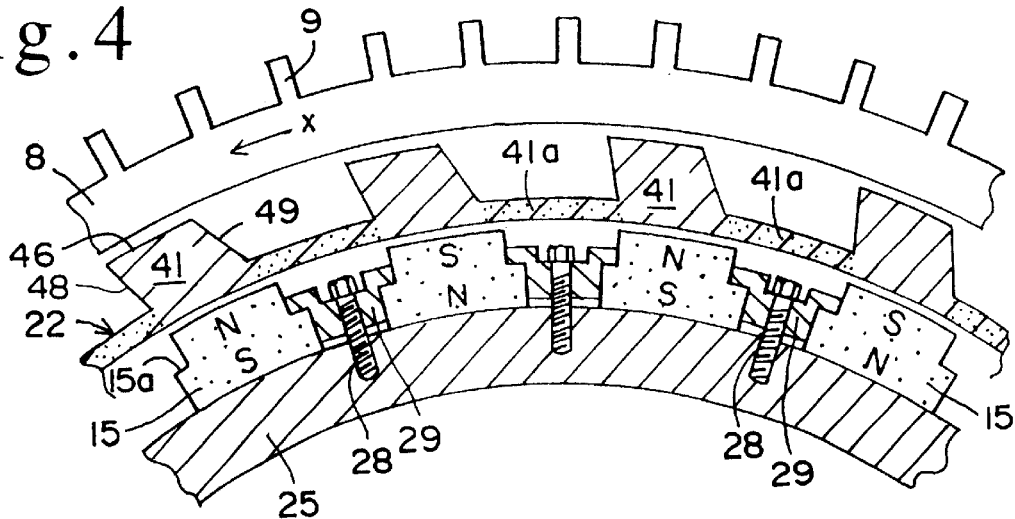
FIG. 4 is a side sectional view showing a partly modified embodiment of the apparatus.

However, since the magnetic circuit w is dragged in the direction x during rotation of the brake drum 8, it is preferable to alter the shape of the first sections 41 as shown in FIGS. 3 and 4. The shape shown in FIG. 3 is preferable in the middle speed rotational area of the brake drum 8 rather than the rectangle of FIG. 2 and the shape shown in FIGS. 4 and 5 is preferable in the high speed rotational area of the brake drum 8, as will be described later.

In the embodiment shown in FIG. 3, the front end surface 48 of the first section 41 in the rotating direction of the brake drum 8 is cut out to form an inclined surface 48a. Similarly, the rear end surface 49 of the first thick section 41 is cut out to form an inclined surface 49a. The magnetic flux density from the magnets 15, 16 can thereby be increased in the thick section 41 and guided to the brake drum 8 to increase brake torque. In the embodiment shown in FIG. 4, the front end surface 48 and the rear end surface 49 of the thick section 41 are inclined in the rotating direction shown by arrow x to form a parallelogram. Consequently, the magnetic flux from the magnets 15, 16 at high speed rotation of the brake drum 8 is drawn into the front end portion of the thick section 41. In the embodiment shown in FIG. 5, the rear half portion of the outer surface 46 of the thick section 41 is cut to form a shoulder 46a. The magnetic flux from the magnets 15, 16 at high speed rotation of the brake drum 8 thereby is further drawn into the front end portion of the thick section 41 to reach the brake drum 8.

As shown in FIG. 2, the magnets 15 are secured to the outer peripheral surface of the magnet support tube 25 by holders 29 sandwiched between the magnets 15. Each holder 29 engages shoulders 15a formed on the front and rear end walls of the magnets 15 and is fastened to the magnet support tube 25 by bolts 28. The magnets 16 are similarly connected to the magnet support tube 26.

Figure 5:
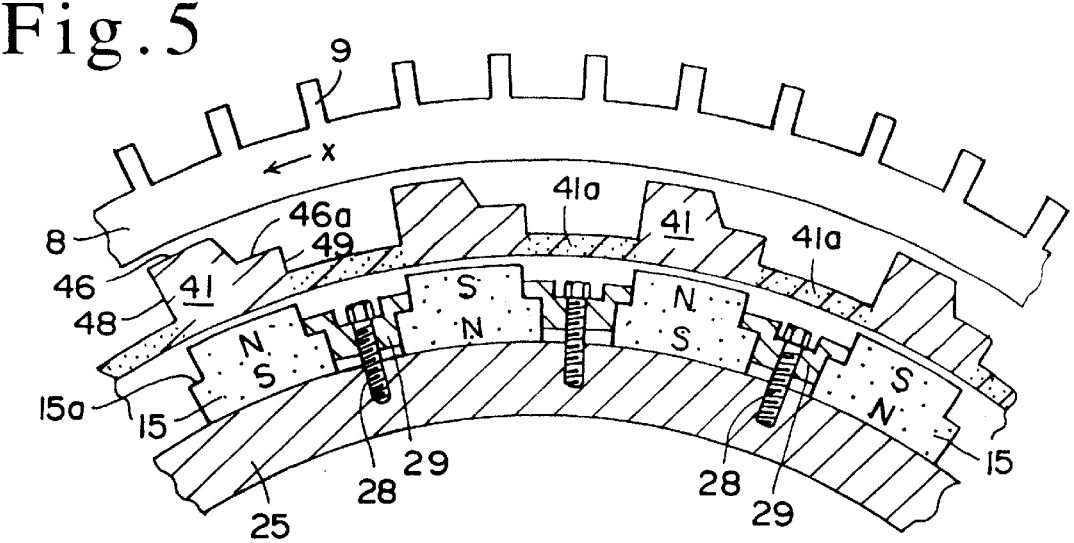
FIG. 5 is a side sectional view showing a partly modified embodiment of the apparatus.
Figure 6:
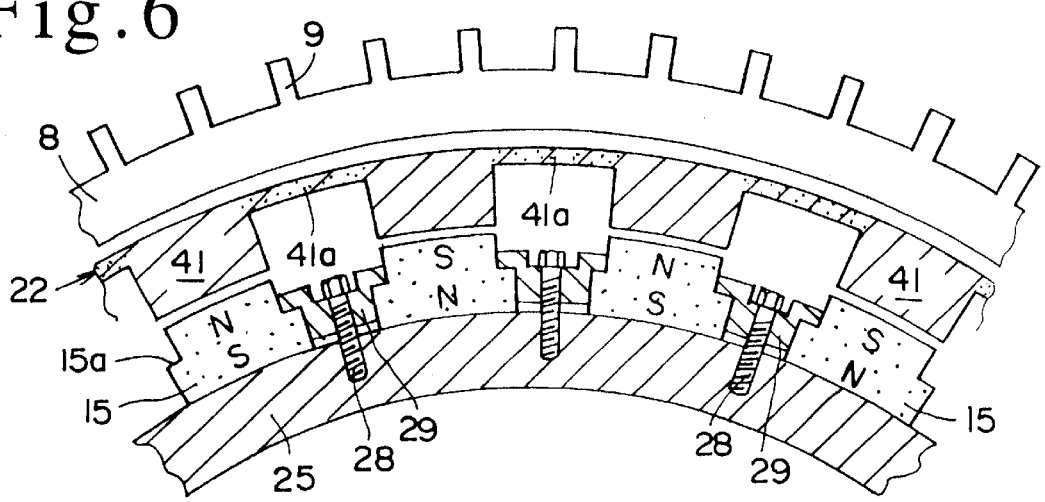
FIG. 6 is a side sectional view of an eddy-current deceleration apparatus according to a second embodiment of the present invention.
Figure 7:
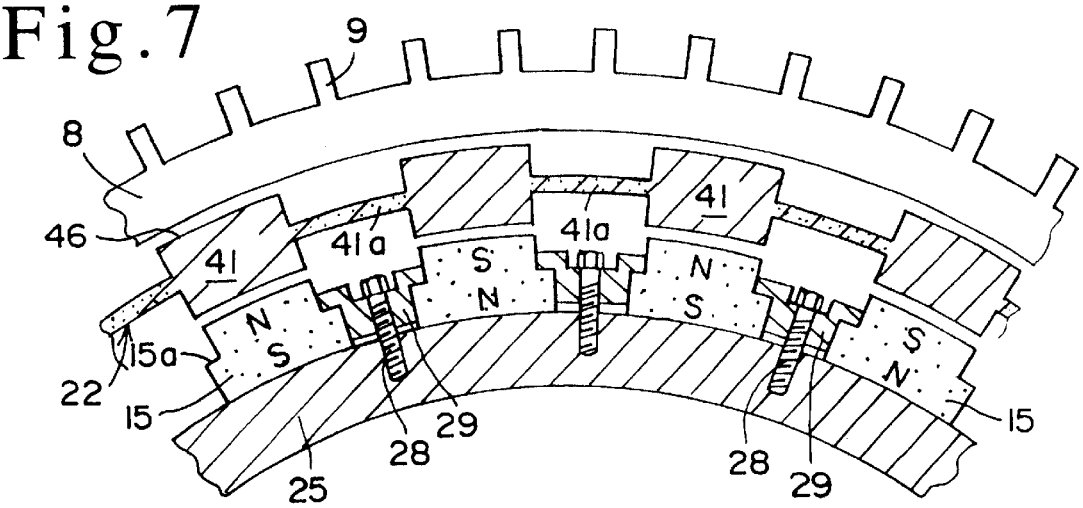
FIG. 7 is a side sectional view of a third embodiment of the present invention.

In the embodiment shown in FIG. 6, oppositely to the embodiments shown in FIGS. 3 to 5, thick first sections 41 are provided on the inner peripheral surface of the outer guide tube 22, and grooves are provided in the inner peripheral surface of the outer guide tube 22. Thus, thin second sections 41a are formed between the thick sections 41. In the embodiment shown in FIG. 7, a thin section 41a is provided between the outer peripheral surface and the inner peripheral surface of the outer guide tube 22.

Figure 8:
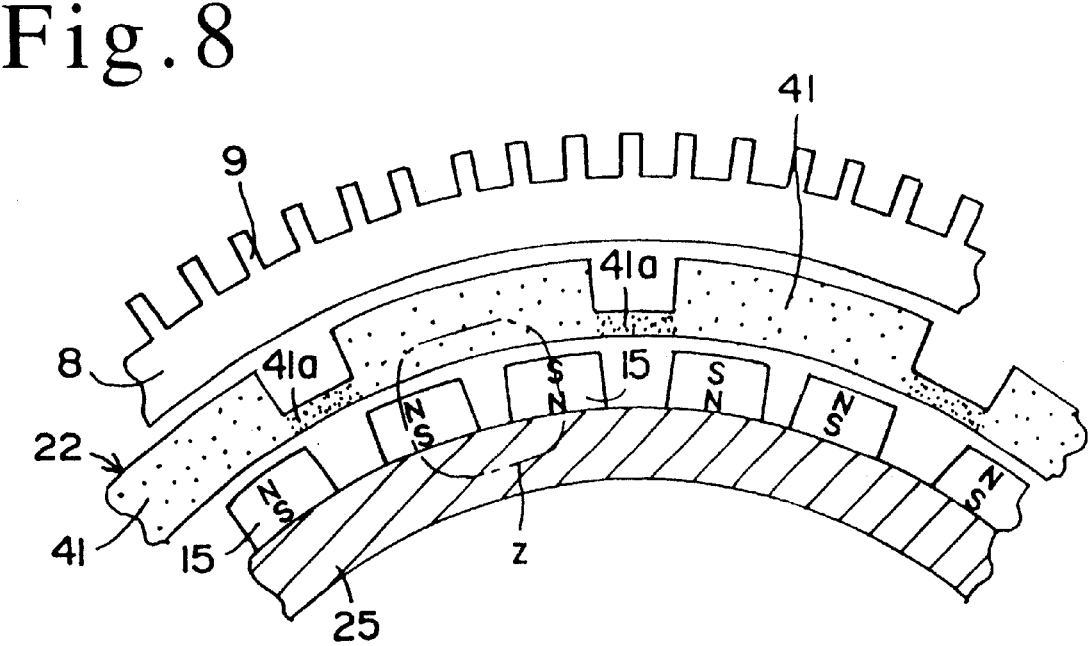
FIG. 8 is a side sectional view showing braking apparatus of another type to which the present invention is applied.
Figure 9:
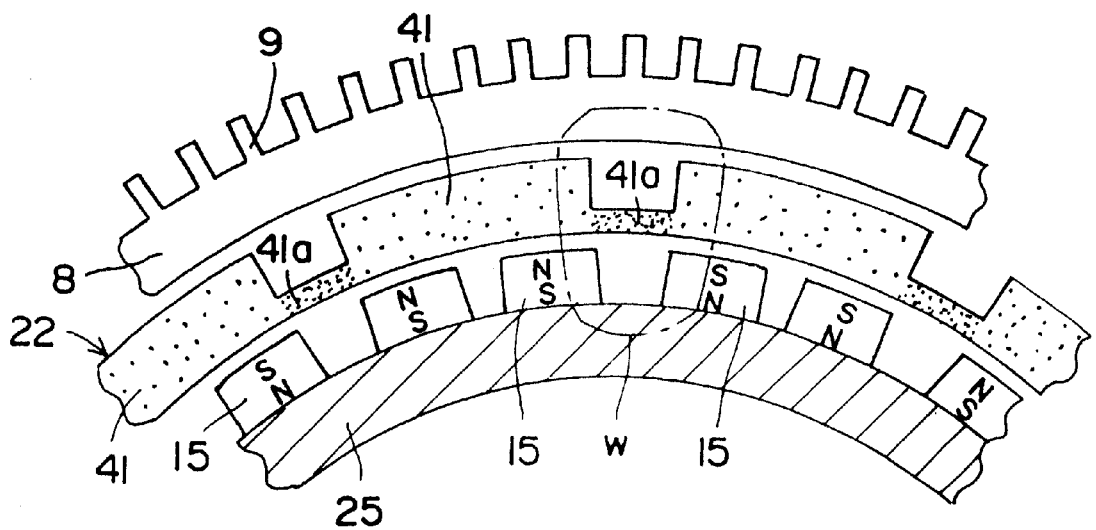
FIG. 9 is a side sectional view showing a braking state of the apparatus shown in FIG. 8.

While in the embodiments shown previously, the movable magnet support tube 25 and the stationary magnet support tube 26 are housed in the hollow portion of the guide tube 21, it is noted that the present invention also can be applied to an apparatus in which only the movable magnet support tube 25 is housed in the hollow portion of the guide tube 21. In FIG. 8, the thin second sections 41a of the outer guide tube 22 again are heated to a high temperature state not less than 800 degress Centigrade (partial solution state) and subsequently rapidly cooled into a nonmagnetic or weak magnetic austenite phase. On the outer peripheral surface of the magnet support tube 25, two magnets 15 are opposed to each thick first section 41, and polarities of the two magnets 15 opposite to a section 41 are different. In a non-braking condition, two magnets 15 of different polarity are opposed to each first section 41, and a short-circuiting magnetic circuit z occurs between the sections 41 and the magnet support tube 25, as shown in FIG. 8. Therefore, no magnetic field reaches the brake drum 8. In a braking condition, the magnet support tube 25 is rotated to rearrange the pitch of the magnets 15, and a magnetic circuit w occurs between the brake drum 8 and the magnet support tube 25, as shown in FIG. 9. Thus, a brake torque is applied to the brake drum 8.

Figure 10:
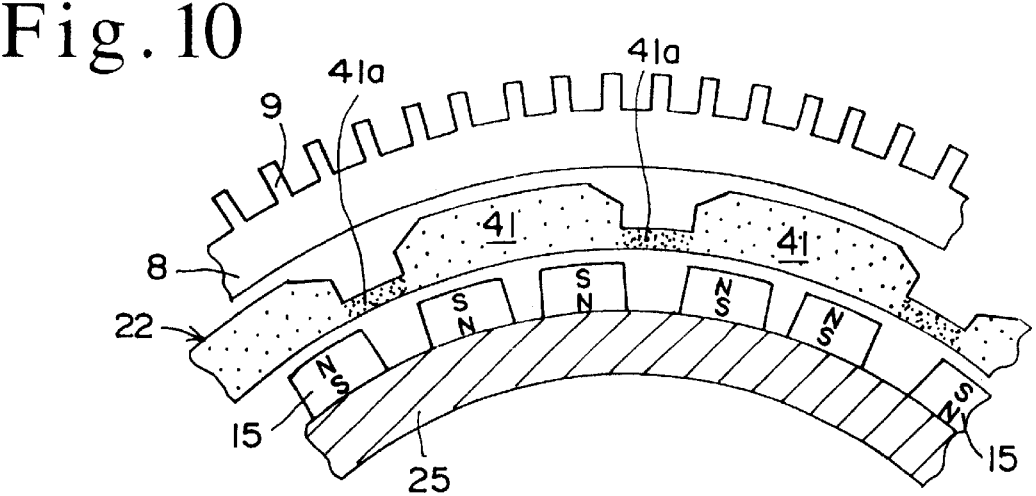
FIG. 10 is a side sectional view showing a partly modified embodiment of the braking apparatus.
Figure 11:
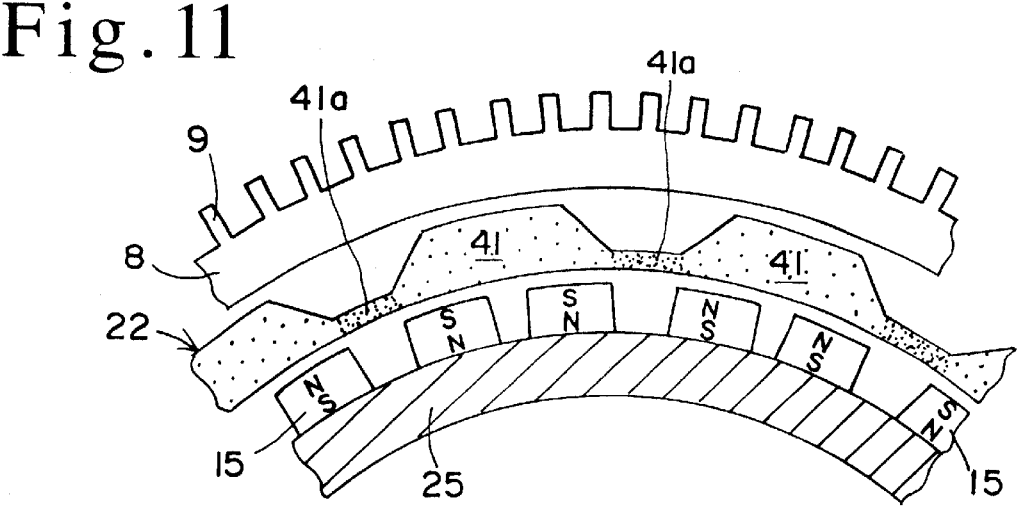
FIG. 11 is a side sectional view showing a partly modified embodiment of the apparatus.
Figure 12:
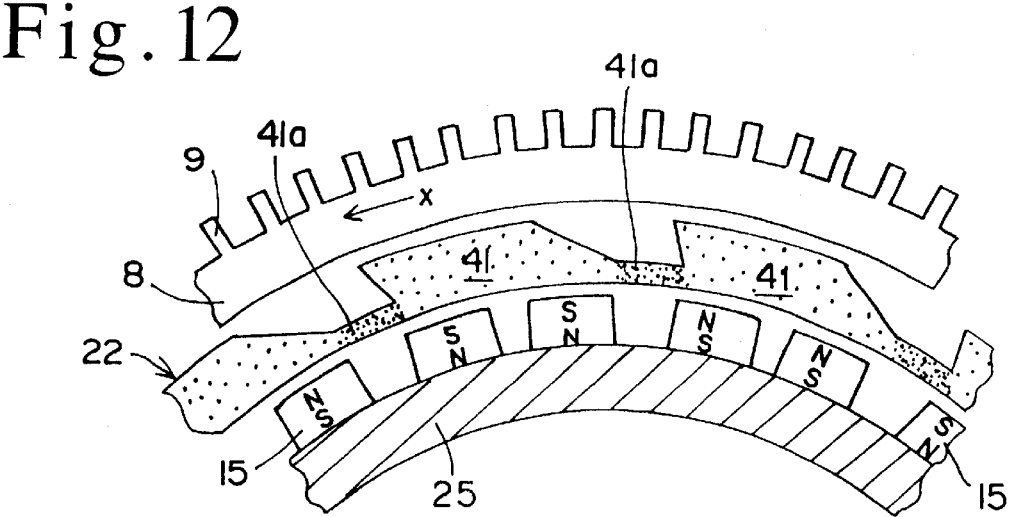
FIG. 12 is a side sectional view showing a partly modified embodiment of the apparatus.
Figure 13:
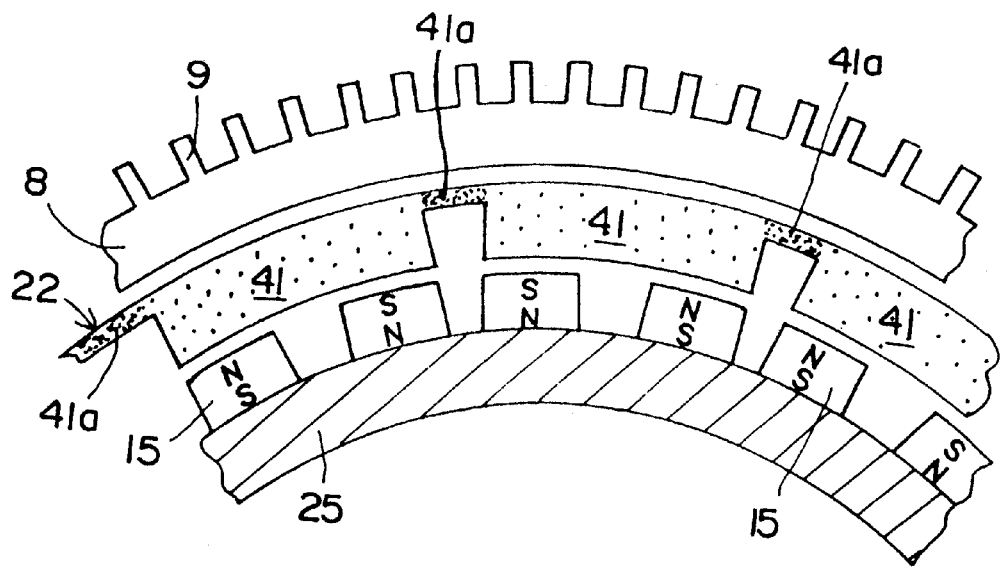
FIG. 13 is a side sectional view of an apparatus according to a fourth embodiment of the present invention.

As shown in FIGS. 10 to 12, with the outer guide tube 22 formed of stainless steel as a magnetic material, the sectional shape of the thick first sections can be changed similarly to the embodiments shown in FIGS. 3 to 5 according to the rotational speed regularly used by the brake drum 8. Also, the thin second sections 41a, which again are heated to a high temperature state not less than 800 degrees Centigrade (partial solution) and subsequently rapidly cooled into a nonmagnetic or weak magnetic austenite phase, are formed on the outer peripheral portion of the outer guide tube 22 as shown in FIG. 13, or formed between the outer peripheral portion and the inner peripheral portion as shown in FIG. 14.

Figure 14:
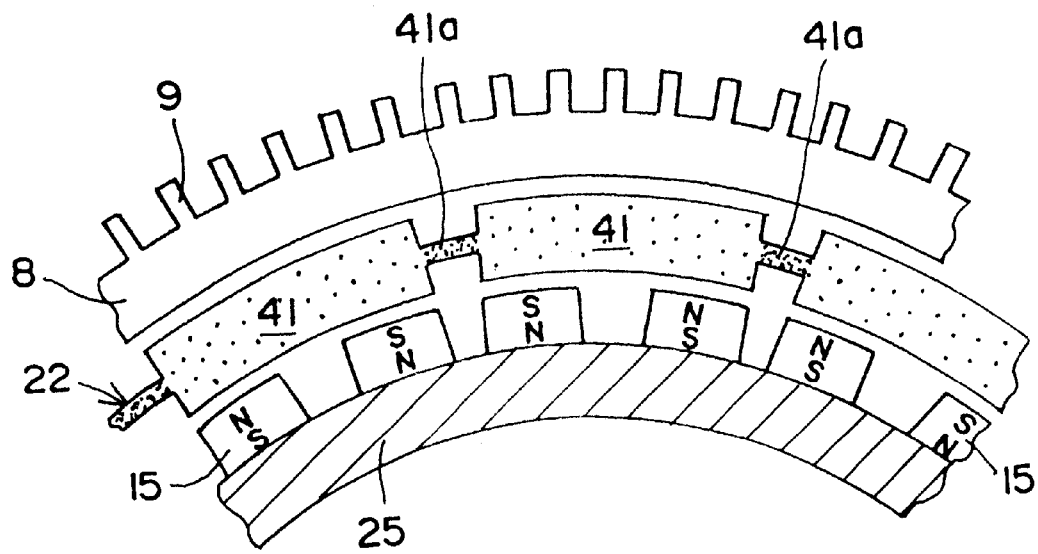
FIG. 14 is a side sectional view of an apparatus according to a fifth embodiment of the present invention.
Figure 15:
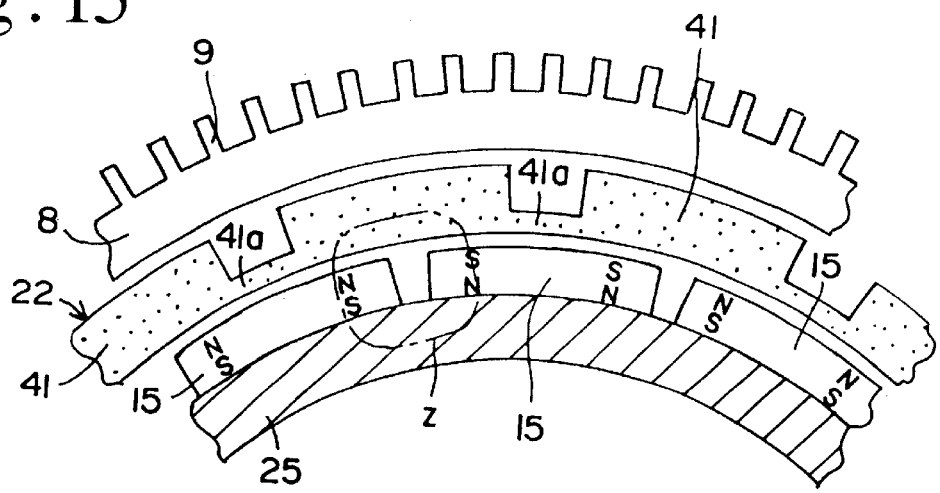
FIG. 15 is a side sectional view showing an apparatus of another type to which the present invention is applied.

In the embodiment shown in FIG. 14, only the movable magnet support tube 25 is received in the hollow portion of the guide tube 21, and the magnets 15 which are opposed to the thick first sections 41 have polarities different alternately in the peripheral direction. In a non-braking condition, the magnet support tube 25 is rotated by a half pitch of the magnets 15 from the related position shown in FIG. 2. Thus, two magnets 15 different in polarity partly oppose to each thick section 41. Consequently, a short-circuiting magnetic circuit z occurs between the magnet support tube 25 and the thick sections 41, and no magnetic field reaches the brake drum 8.

Figure 16:
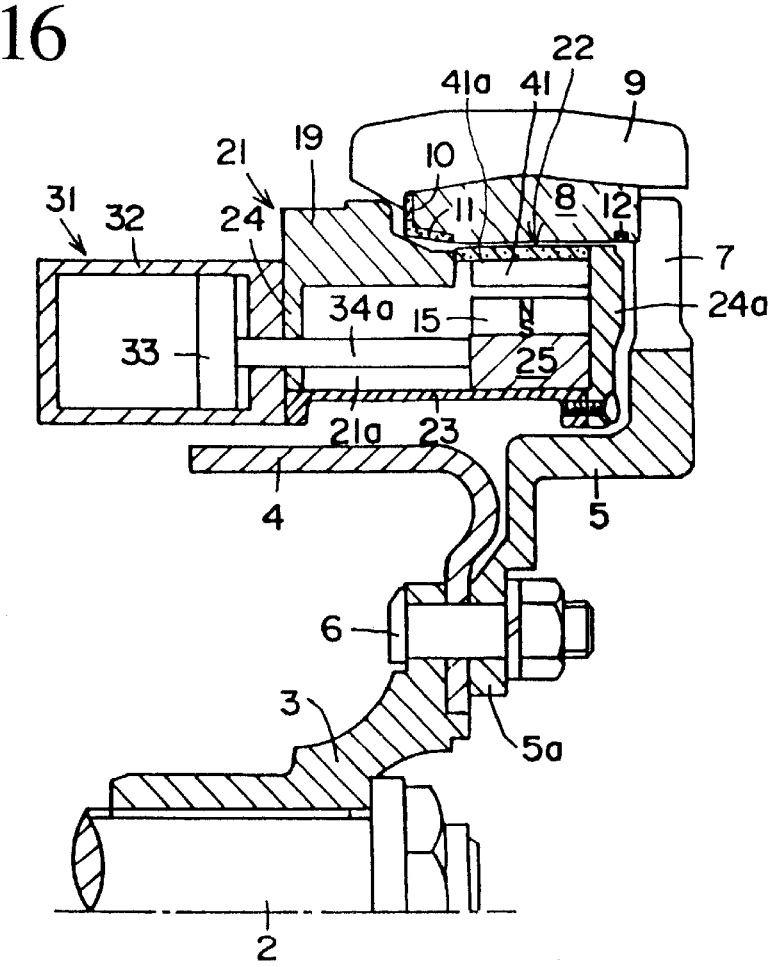
FIG. 16 is a front sectional view showing an apparatus of another type to which the present invention is applied.

As shown in FIG. 16, the present invention also can be applied to an eddy-current apparatus of the type in which the magnet support tube 25 is moved by the fluid pressure actuator 31 between a braking position within the brake drum 8 and a non-braking position out of the brake drum 8. The guide tube 21 is formed with a rectangular (in section) hollow portion 21a by an outer guide tube 19 formed of a soft magnetic material, a side wall 24, an inner guide tube 23 formed of a non-magnetic material, an outer guide tube 22 of stainless steel as a magnetic material and a side wall 24a of non-magnetic material. A number of magnetic plates or thick first alternating sections 41 again are formed in equally spaced relation on the inner peripheral surface of the outer guide tube 22, and thin second sections 41a between the thick sections 41 are heated to a high temperature state not less than 800 degrees Centigrade (partial solution state) and subsequently rapidly cooled into a nonmagnetic or weak magnetic austenite phase. The magnet support tube 25 for supporting the magnets 15 opposite to the thick sections 41 is housed in the hollow portion 21a and is supported so as to reciprocate along the inner guide tube 23. A rod 34a extends into the hollow portion 21a through the side wall 24 from the piston 33 of the fluid pressure actuator 31 and is connected to the magnet support tube 25. The fluid pressure actuator 31 is different than that shown in FIG. 16 in that the cylinder 32 is disposed axially of the brake drum 8, and the end wall is connected to the side wall 24 while the brake drum 8 is similar to that shown in FIG. 1. When in a non-braking condition, the magnet support tube 25 is drawn out of the braking position shown in FIG. 16 to a position outside of the brake drum 8. Consequently, a short-circuiting magnetic circuit is formed between the outer guide tube 19 and the magnet support tube 25, and no magnetic field reaches the brake drum 8.

Figure 17:
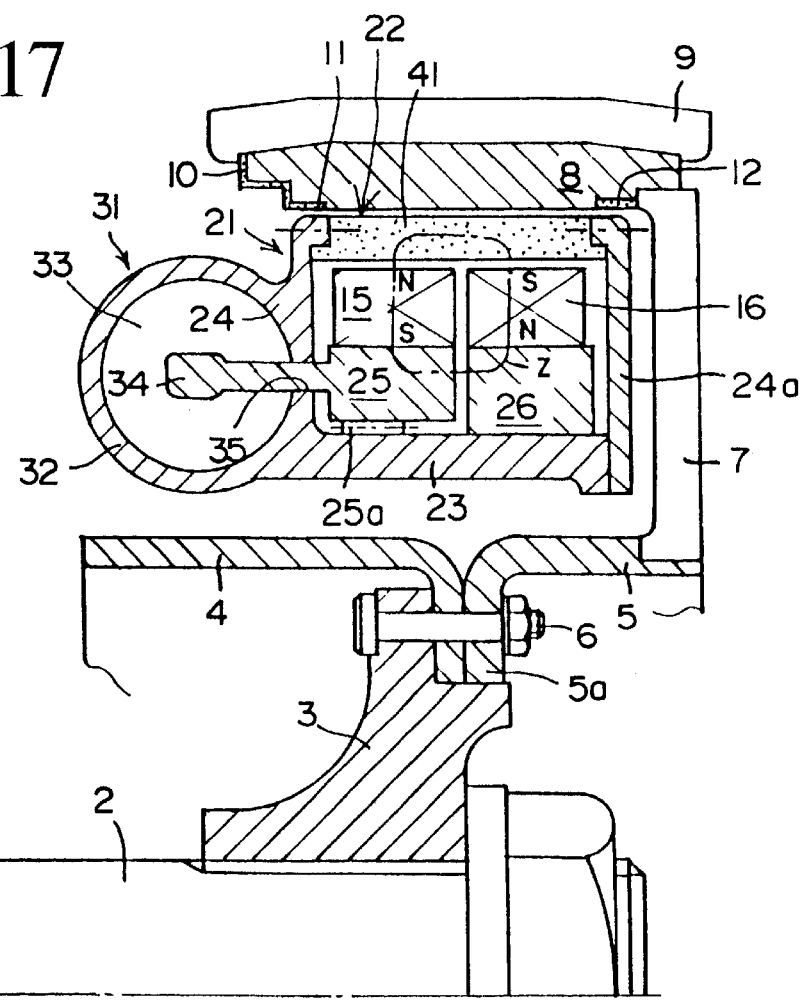
FIG. 17 is a front sectional view of an apparatus according to a sixth embodiment of the present invention.
Figure 18:
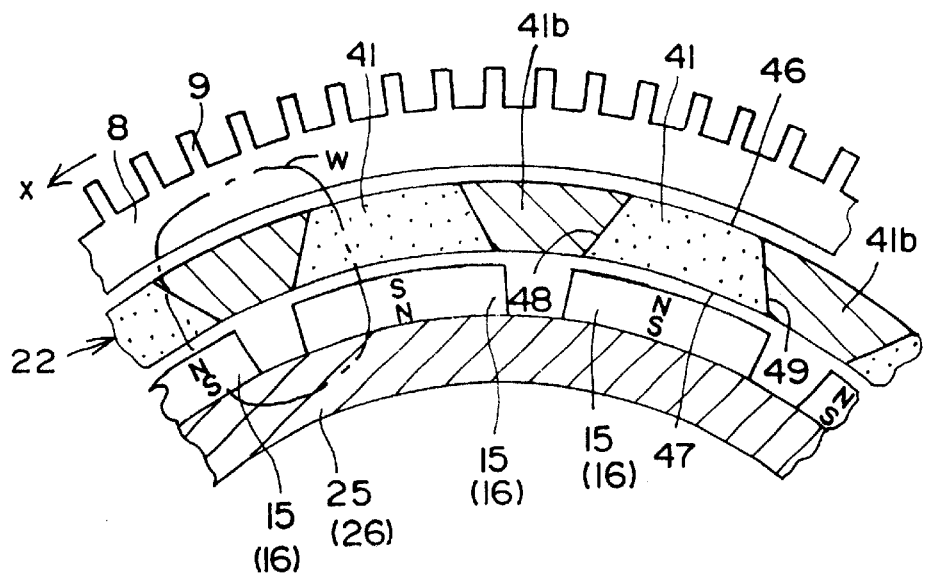
FIG. 18 is a side sectional view of the apparatus shown in FIG. 17.

In the embodiments shown in FIGS. 17 to 22, the outer guide tube 22 is manufactured from a steel pipe obtained by roll molding and welding a plate of martensite stainless steel or ferrite stainless steel and having a thickness of approximately 10 to 16 mm, or from a seamless steel pipe of martensite stainless steel or ferrite stainless steel having a thickness of approximately 10 to 16 mm. As shown in FIG. 17, the outer guide tube 22 preferably is connected by a plurality of bolts (not shown) between the side wall 24 and the side wall 24a of the guide tube 21 formed of a nonmagnetic material such as aluminum. Other parts of the eddy-current apparatus are similar to those shown in FIG. 1. As shown in FIG. 18, the outer guide tube 22 formed from a stainless steel pipe of magnetic material, has a uniform thickness. Magnetic first sections 41 opposite to the magnets 15, 16 are left as magnetic material and second sections 41b not opposite to the magnets 15, 16 are locally heated to a high temperature of 800 to 1350 degrees Centigrade (partial solution state) and subsequently rapidly cooled into a nonmagnetic or weak magnetic austenite phase.

For obtaining roundness, the outer guide tube 22 is subjected to finishing and subsequently applied with coating for rust prevention. Preferably, a depression or a groove is formed in the outer surface of the nonmagnetic or weak magnetic section 41b of the outer guide tube 22 so as to highlight the magnetic sections 41 and the nonmagnetic or weak magnetic sections 41b. The outer surface 46 of each magnetic section 41 is made smaller in area or peripheral dimension than the inner surface 47 opposite to the magnets 15, 16. That is, a side section of the magnetic portion 41 is made to be trapezoidal to increase the magnetic flux density from the magnets 15, 16 applied to the brake drum 8 and thereby increase braking torque.

Figure 19:
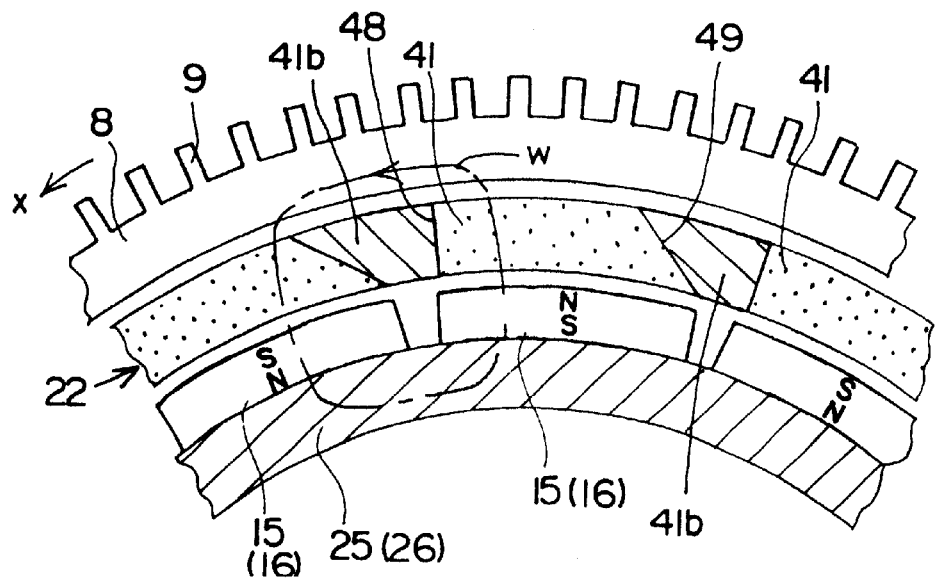
FIG. 19 is a side sectional view of a partly modified embodiment of the braking apparatus.
Figure 20:
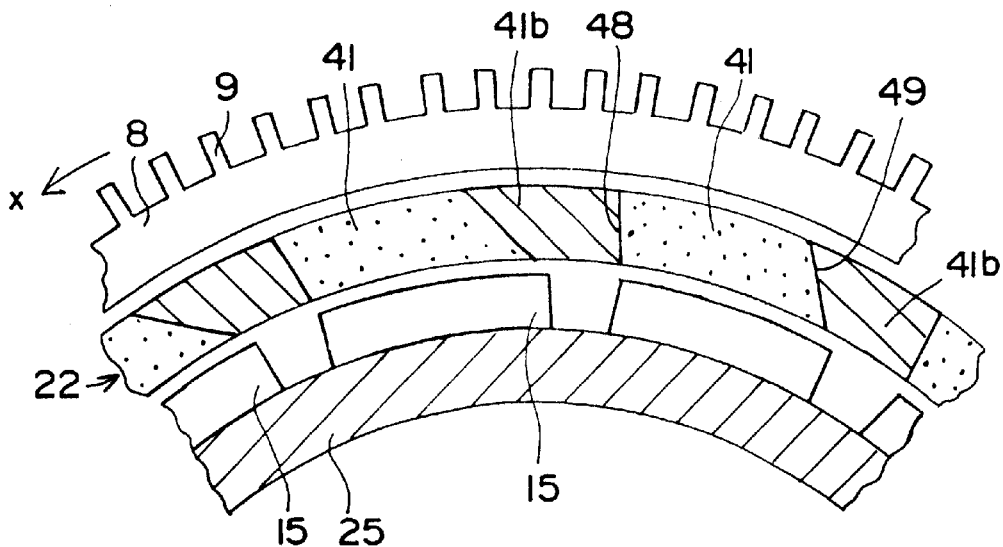
FIG. 20 is a side sectional view showing a partly modified embodiment of the apparatus.

In the embodiment shown in FIG. 19, the magnetic circuit w formed between the brake drum 8 and the magnet support tubes 25, 26 during high speed rotation of the brake drum 8, tends to flow in the rotational direction indicated by arrow x. That is, the density of the magnetic flux from the magnets 15, 16 tends to be concentrated on the front end portion of the magnetic section 41, and therefore, the rear end surface 49 of the magnetic section 41 is inclined in the rotational direction of the brake drum 8. As shown in FIG. 20, the front end surface 48 of the magnetic section 41 is also preferably inclined slightly in the rotational direction (arrow x) of the brake drum 8.

Figure 21:
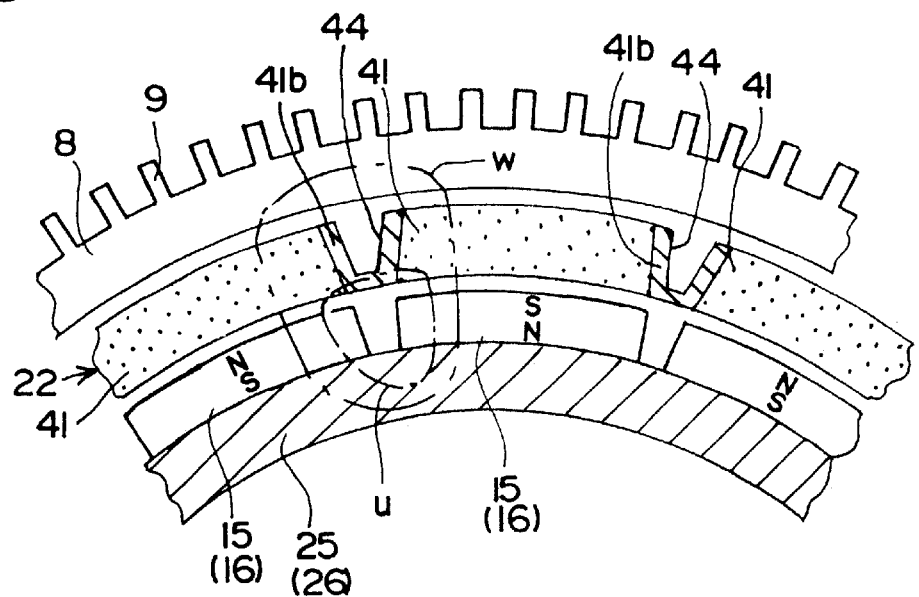
FIG. 21 is a side sectional view showing a partly modified embodiment.
Figure 22:
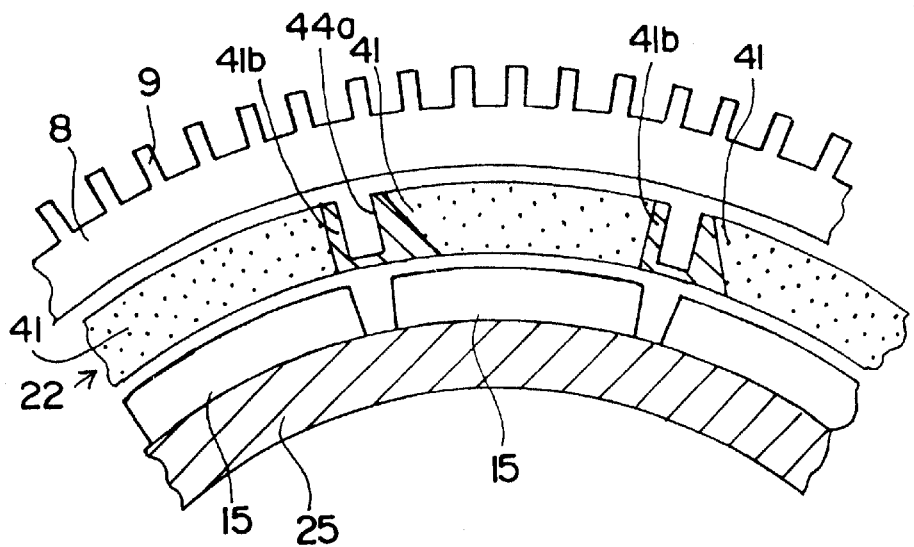
FIG. 22 is a side sectional view showing another partly modified embodiment of the apparatus.

In the embodiment shown in FIG. 21, a magnetic stainless steel pipe is subjected to heat treatment to form nonmagnetic or weak magnetic sections 41b, after which a V-shaped axial groove 44 is machined in the outer peripheral surface of each nonmagnetic or weak magnetic section 41b. The sections 41b are not rendered nonmagnetic completely by the heat treatment as strictly speaking, but are rather weakly magnetic. Therefore, the weak magnetic sections 41b are provided with grooves 44. The thicknesses of the side wall and the bottom wall of the groove 44 are substantially equal so that the thickness of each weak magnetic section 41b is made thin to thereby suppress formation of leaked magnetic circuits or short-circuiting magnetic circuits. As shown in FIG. 22, a rectangular (in section) groove 44a can be provided according to the sectional shape of the weak magnetic section 41b in place of a V-shaped groove.

In the embodiments shown in FIGS. 17 to 22, an outer guide tube 22 of uniform thickness stainless steel pipe is subjected to heat treatment to form the weak magnetic sections 41b and the magnetic sections 41. Therefore, less heat distortion of the outer guide tube 22 occurs, and the machining properties of the weak magnetic sections 41b are improved, facilitating machining of the grooves 44 and 44a. The dimensional accuracy of the inner and outer peripheral surfaces of the outer guide tube 22 is excellent as compared with the case where a thin section is subjected to heat treatment after the outer guide tube 22 has been formed in advance with both thick portion and thin sections. Also, since the outer guide tube 22 can be processed from a tubular member formed of simple stainless steel, the manufacturing cost can be reduced considerably.

Obviously, many modifications and variations of the present invention are possible in light of the above teachings. It is to be understood, therefore, that the invention can be practiced otherwise than as specifically, described.

What is claimed is:

1. A method of producing a magnetic eddy-current braking apparatus for use within the brake drum of a vehicle, the method comprising the steps of:

mounting on a support an array of annularly spaced apart permanent magnets for disposition within the brake drum;

forming a stainless steel tube dimensional for disposition between said array and the brake drum, said tube having annularly spaced apart first sections adapted for radial alignment between said magnets and the brake drum and annularly spaced apart second sections each joining different adjacent pairs of said first sections;

heating only said second regions of said tube to an austenitic phase;

rapidly cooling said second sections into a substantially non-magnetic state; and supporting said tube around said array so as to allow annular relative movement between said second sections and said magnets between radially aligned and non-aligned positions.

2. A method according to claim 1 wherein said heating step comprises heating said second regions to a temperature of at least 800° C.

3. A method according to claim 2 wherein said first sections have a uniform thickness substantially less than a uniform thickness of said second sections.

4. A method according to claim 3 wherein said first regions have a uniform outer surface area less than a uniform inner surface area.

5. A method according to claim 4 wherein said outer surface of each said first section is displaced annularly from its said inner surface.

6. A method according to claim 2 wherein said first and second regions have uniform widths.

7. A method according to claim 6 wherein said first regions have a uniform outer surface area less than a uniform inner surface area.

8. A method according to claim 7 wherein said outer surface of each said first section is displaced annularly from its said inner surface.

9. A magnetic eddy-current braking apparatus comprising:

a brake drum;

an array of annularly spaced apart permanent magnets disposed within said brake drum;

a stainless steel tube mounted between said array and said brake drum, said steel tube having annularly spaced apart magnetic first sections and austenitized non-magnetic second sections each joining different adjacent pairs of said first sections; and actuator means for producing annular relative movement between said second sections and said magnets between radially aligned and non-aligned positions.

10. An apparatus according to claim 9 wherein said first sections have a uniform thickness substantially less than a uniform thickness of said second sections.

11. An apparatus according to claim 10 wherein said first regions have a uniform outer surface area less than a uniform inner surface area.

12. An apparatus according to claim 11 wherein said outer surface of each said first section is displaced annularly from its said inner surface.

13. An apparatus according to claim 9 wherein said first and second regions have uniform widths.

14. An apparatus according to claim 13 wherein said first regions have a uniform outer surface area less than a uniform inner surface area.

15. An apparatus according to claim 14 wherein said outer surface of each said first section is displaced annularly from its said inner surface.

* * * * *